United States Patent
Barabash et al.

(10) Patent No.: US 11,070,654 B2
(45) Date of Patent: Jul. 20, 2021

(54) SOCKETS FOR SHARED LINK APPLICATIONS

(71) Applicant: EMC IP HOLDING COMPANY LLC, Hopkinton, MA (US)

(72) Inventors: Alexander Barabash, Rehovot (IL); Leonid Ravich, Yatzitz (IL); Eyal Ben Ner, Hod Hasharon (IL); Xiangping Chen, Sherborn, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 7 days.

(21) Appl. No.: 16/592,328

(22) Filed: Oct. 3, 2019

(65) Prior Publication Data

US 2021/0105343 A1   Apr. 8, 2021

(51) Int. Cl.
| | | |
|---|---|---|
| H04L 29/06 | (2006.01) |
| H04L 12/801 | (2013.01) |
| H04L 29/08 | (2006.01) |
| G06F 3/06 | (2006.01) |
| H04L 12/26 | (2006.01) |
| H04L 12/807 | (2013.01) |

(52) U.S. Cl.
CPC ............ *H04L 69/162* (2013.01); *G06F 3/065* (2013.01); *H04L 47/10* (2013.01); *H04L 67/1095* (2013.01); *G06F 2003/0691* (2013.01); *H04L 43/0864* (2013.01); *H04L 47/27* (2013.01)

(58) Field of Classification Search
CPC ............ G06F 3/065; G06F 2003/0691; H04L 43/0864; H04L 47/10; H04L 47/27; H04L 69/162; H04L 67/1095
See application file for complete search history.

(56) References Cited

U.S. PATENT DOCUMENTS

| | | |
|---|---|---|
| 7,475,124 B2 | 1/2009 | Jiang et al. |
| 8,327,103 B1 | 12/2012 | Can et al. |
| 8,380,928 B1 | 2/2013 | Chen et al. |
| 8,429,346 B1 | 4/2013 | Chen et al. |
| 8,515,911 B1 | 8/2013 | Zhou et al. |

(Continued)

OTHER PUBLICATIONS

U.S. Appl. No. 15/499,943, filed Apr. 28, 2017, Kucherov et al.

(Continued)

*Primary Examiner* — Jeong S Park
(74) *Attorney, Agent, or Firm* — Daly, Crowley Mofford & Durkee, LLP

(57) ABSTRACT

A method is disclosed comprising: instantiating a first plurality of type-1 network sockets on a source computing system, each of the type-1 network sockets having a first queue depth; instantiating a second plurality of type-2 network sockets on the source computing system, each of the type-2 network sockets having a second queue depth that is greater than the first queue depth; transitioning the source computing system into a first state, the first state being one in which data replication messages are transmitted by the source computing system to a target computing system by using both the type-1 and type-2 network sockets; transitioning the source computing system from the first state into a second state, the second state being one in which data replication messages are transmitted by the source computing system to the target computing system by using the type-2 network sockets.

20 Claims, 8 Drawing Sheets

(56) References Cited

U.S. PATENT DOCUMENTS

| | | |
|---|---|---|
| 8,539,148 B1 | 9/2013 | Chen et al. |
| 8,566,483 B1 | 10/2013 | Chen et al. |
| 8,583,607 B1 | 11/2013 | Chen et al. |
| 8,683,153 B1 | 3/2014 | Long et al. |
| 8,712,976 B1 | 4/2014 | Chen et al. |
| 8,775,388 B1 | 7/2014 | Chen et al. |
| 8,782,324 B1 | 7/2014 | Chen et al. |
| 8,799,601 B1 | 8/2014 | Chen et al. |
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 9,152,336 B1 | 10/2015 | Chen et al. |
| 9,304,889 B1 | 4/2016 | Chen et al. |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,114,582 B1 * | 10/2018 | Rao ............... G06F 11/3485 |
| 10,152,381 B1 | 12/2018 | Shvaiger et al. |
| 10,176,046 B1 | 1/2019 | Hu et al. |
| 10,235,066 B1 | 3/2019 | Chen et al. |
| 10,248,623 B1 | 4/2019 | Chen et al. |
| 10,261,853 B1 | 4/2019 | Chen et al. |
| 10,310,951 B1 | 6/2019 | Chen et al. |
| 10,324,640 B1 | 6/2019 | Chen et al. |
| 10,338,851 B1 | 7/2019 | Kronrod et al. |
| 10,353,616 B1 | 7/2019 | Tao et al. |
| 10,359,968 B1 | 7/2019 | Chen et al. |
| 10,374,792 B1 | 8/2019 | Meiri et al. |
| 10,394,485 B1 | 8/2019 | Chen et al. |
| 10,402,283 B1 | 9/2019 | Chen et al. |
| 10,409,493 B1 | 9/2019 | Kucherov et al. |
| 10,459,632 B1 | 10/2019 | Chen et al. |
| 10,459,883 B1 | 10/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,565,058 B1 | 2/2020 | Meiri et al. |
| 2004/0003085 A1 * | 1/2004 | Joseph ............... H04L 69/16 709/226 |
| 2010/0088423 A1 * | 4/2010 | Mazzagatte ........... H04L 67/36 709/229 |
| 2010/0246398 A1 * | 9/2010 | Chiang ............... H04L 47/2475 370/235 |
| 2013/0191525 A1 * | 7/2013 | Kang ................. H04L 69/162 709/223 |
| 2016/0191934 A1 * | 6/2016 | Kraiman ............. H04N 19/124 375/240.03 |
| 2017/0324672 A1 * | 11/2017 | Lee .................. H04L 43/0864 |

OTHER PUBLICATIONS

U.S. Appl. No. 15/499,949, filed Apr. 28, 2017, Chen et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 16/375,001, filed Apr. 4, 2019, Chen et al.
U.S. Appl. No. 16/380,087, filed Apr. 10, 2019, Kronrod et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.
U.S. Appl. No. 16/511,676, filed Jul. 15, 2019, Chen et al.

* cited by examiner

SOCKETS FOR SHARED LINK APPLICATIONS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: instantiating a first plurality of type-1 network sockets on a source computing system, each of the type-1 network sockets having a first queue depth; instantiating a second plurality of type-2 network sockets on the source computing system, each of the type-2 network sockets having a second queue depth that is greater than the first queue depth; transitioning the source computing system into a first state, the first state being one in which data replication messages are transmitted by the source computing system to a target computing system by using both the type-1 and type-2 network sockets; transitioning the source computing system from the first state into a second state, the second state being one in which data replication messages are transmitted by the source computing system to the target computing system by using only the type-2 network sockets, wherein the source computing system is transitioned from the first state to the second state in response to detecting a request to transmit a synchronous data replication message, and wherein, when the source computing system is in the second state, no type-1 network sockets are used, by the source computing system, for the transmission of data replication messages.

According to aspects of the disclosure, a system is provided comprising: a memory; and at least one processor operatively coupled to the memory, the at least one processor being configured to perform the operations of: instantiating a first plurality of type-1 network sockets, each of the type-1 network sockets having a first queue depth; instantiating a second plurality of type-2 network sockets, each of the type-2 network sockets having a second queue depth that is greater than the first queue depth; transitioning the system into a first state, the first state being one in which data replication messages are transmitted by the at least one processor to another system by using both the type-1 and type-2 network sockets; transitioning the system from the first state into a second state, the second state being one in which data replication messages are transmitted by the at least one processor to the other system by using only the type-2 network sockets, wherein the transition from the first state to the second state is performed in response to detecting a request to transmit a synchronous data replication message, and wherein, when the source computing system is in the second state, no type-1 network sockets are used, by the source computing system, for the transmission of data replication messages.

According to aspects of the disclosure, a non-transitory computer-readable medium storing one or more processor-executable instructions, which when executed by at least one processor of a system cause the at least one processor to perform the operations of: instantiating a first plurality of type-1 network sockets, each of the type-1 network sockets having a first queue depth; instantiating a second plurality of type-2 network sockets, each of the type-2 network sockets having a second queue depth that is greater than the first queue depth; transitioning the system into a first state, the first state being one in which data replication messages are transmitted by the at least one processor to another system by using both the type-1 and type-2 network sockets; transitioning the system from the first state into a second state, the second state being one in which data replication messages are transmitted by the at least one processor to the other system by using only the type-2 network sockets, wherein the transition from the first state to the second state is performed in response to detecting a request to transmit a synchronous data replication message, and wherein, when the source computing system is in the second state, no type-1 network sockets are used, by the source computing system, for the transmission of data replication messages.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
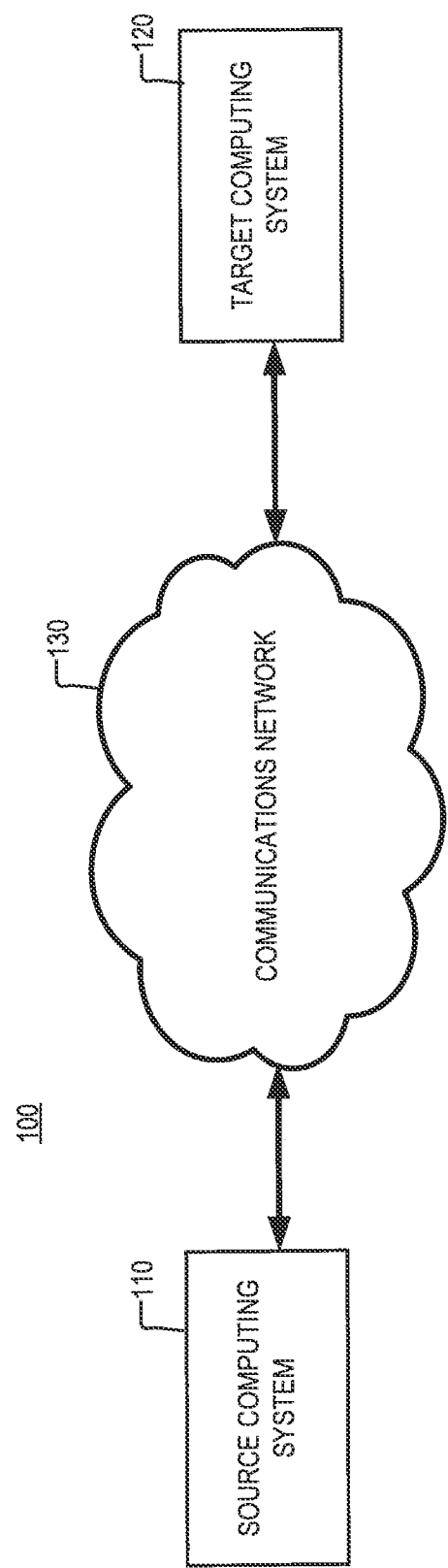
FIG. 1 is a diagram of an example of a system, according to aspects of the disclosure.

FIG. 1 is a diagram of an example of a system 100, according to aspects of the disclosure. The system 110 may include a source computing system 110 that is coupled to a target computing system 120 via a communications network 130.

The system 110 may include any suitable type of computing device, such as a desktop computer, a smartphone, a laptop, or a server (e.g., storage server). Additionally or alternatively, in some implementations, the system 110 may include multiple computing devices, such as multiple servers, multiple laptops, a server cluster, a distributed computing system, etc. Additionally or alternatively, in some implementations, the system 110 may include a storage system (or portion thereof), such as a midrange storage system, an enterprise storage system, and/or any other suitable type of storage system. According to the present disclosure, the system 110 includes a storage server or a storage system. However, it will the understood that the present disclosure is not limited to any specific implementation of the system 110.

The system 120 may include any suitable type of computing device, such as a desktop computer, a smartphone, a laptop, or a server (e.g., storage server). Additionally or alternatively, in some implementations, the system 120 may include multiple computing devices, such as multiple servers, multiple laptops, server cluster, a distributed computing system, etc. Additionally or alternatively, in some implementations, the system 120 may include a storage system (or portion thereof), such as a midrange storage system, an enterprise storage system, and/or any other suitable type of storage system. Stated succinctly, the present disclosure is not limited to any specific implementation of the system 120.

The network 130 may include a Transport Control Protocol (TCP) network. Although in the present example, the network 130 includes a TCP network, alternative implementations are possible in which the communications network includes any other suitable type of network, such as an InfiniBand network, the Internet, etc. Stated succinctly, the present disclosure is not limited to using any specific type of network for connecting the system 110 to the system 120.

Figure 2:
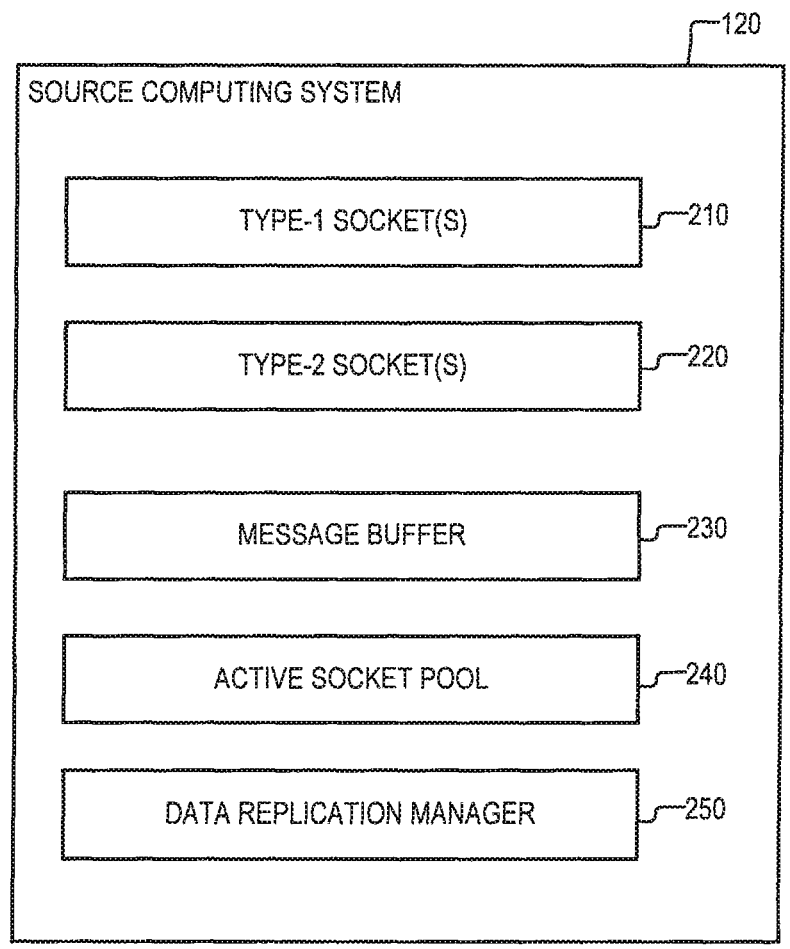
FIG. 2 is a block diagram of an example of a computing system, according to aspects of the disclosure.

FIG. 2 is a diagram illustrating a logical organization of the system 110 in further detail. As illustrated, the system 110 may include a set of type-1 sockets 210, a set of type-2 sockets 220, a message buffer 230, an active socket pool 240, and a data replication manager 250.

The set of type-1 sockets 210 may include one or more type-1 sockets. Each of the type-1 sockets may include (a representation of) an internal endpoint that is instantiated in a memory of the system 110. According to the present example, each of the type-1 sockets 210 is a TCP socket. However, alternative implementations are possible in which another type of network sockets is used. Stated succinctly, the present disclosure is not limited to using any specific type of socket as a type-1 socket.

The set of type-2 sockets 220 may include one or more type-2 sockets. Each of the type-2 sockets may include (a representation of) an internal endpoint that is instantiated in a memory of the system 110. According to the present example, each of the type-2 sockets 220 is a TCP socket. However, alternative implementations are possible in which another type of network socket is used. Stated succinctly, the present disclosure is not limited to using any specific type of socket as a type-2 socket.

The type-1 and type-2 sockets may differ from one another in at least one characteristic. According to the present example, both the type-1 and type-2 sockets are TCP sockets that differ in queue depth. Specifically, the type-1 sockets may have a first queue depth. And the type-2 sockets may have a second queue depth that is greater than the first queue depth. The term "queue depth" as used in relation to a socket, refers to the size of the socket's respective queue. The respective queue of a socket may be a location in the memory of the computing system (e.g., random access memory, onboard memory of a network adapter, etc.), where data replication messages are stored before they are transmitted via the socket. In other words, according to the present example, each of the type-1 and type-2 sockets has a respective queue. The respective queue of each of the type-1 sockets may have a first queue depth, and the respective queue of each of the type-2 sockets may have a second queue depth that is greater than the first queue depth.

The message buffer 230 may include any memory location, or set of memory locations, where data replication messages are stored before being transferred into the respective queue of any of the type-1 or type-2 sockets. According to the present example, the message buffer 230 includes a single queue that is populated with data replication messages by process(es) that are executed on the system 110. Although in the present example the message buffer 230 is composed of memory locations that are associated with the same data structure (or variable), alternative implementations are possible in which the message buffer 230 is composed of memory locations that are associated with different data structures (or variables). Although in the present example the message buffer 230 is large enough to hold multiple data replication messages, alternative implements are possible in which the message buffer 230 is the size of a single data replication message. Stated succinctly, the present disclosure is not limited to any specific implementation of the message buffer 230.

The active socket pool 240 may include sockets that are available for transmitting the messages in the message buffer 230. According to the present example, when a socket is part of the active socket pool 240, that socket can be used to transmit (to the target system 120) data replication messages. By contrast, when a socket is not part of the active socket pool 240, that socket cannot be used to transmit (to the target system 120) data replication messages. In some implementations, the active socket pool 240 may include any of the type-1 sockets 210 and the type-2 sockets 220. As is discussed further below, the type-1 sockets 210 may be dynamically added and removed from the pool depending on the type of data replication that is being performed by the source system 110.

In some implementations, the active socket pool 240 may include a list of socket identifiers. When a given type-1 or type-2 socket is identified in the list, that socket may be considered to be part of the active socket pool 240. Adding a socket to the active socket pool 240 may include adding an identifier corresponding of the socket to the list, Removing a socket from the active socket pool 240 may include deleting an identifier of the socket from the list.

The data replication manager 250 may include logic for the transmission of data replication messages. In some implementations, the data replication manager 250 may be configured to change the state of the system 110, as discussed further below with respect to FIG. 4. Additionally or alternatively, in some implementations, the data replication manager 250 may be configured to perform the process 500, which is discussed further below with respect to FIG. 5. According to the present example, the data replication manager 250 is implemented in software. However, alternative implementations are possible in which the data replication manager 250 is implemented in hardware or as a combination of software and hardware.

Figure 3:
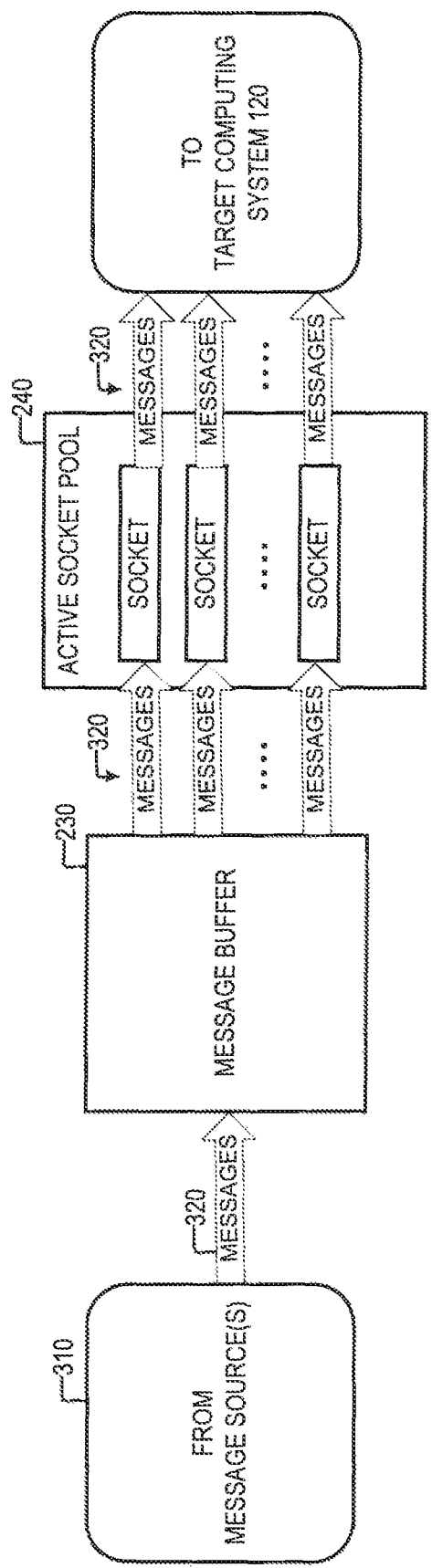
FIG. 3 is a block diagram illustrating the operation of the computing system of FIG. 2, according to aspects of the disclosure.

FIG. 3 is a block diagram illustrating the operation of the system 110 in further detail. As illustrated, one or more message sources 310 may place data replication messages 320 in the message buffer 230. Each of the message sources 310 may include a process (or thread) that is executed on the system 110 or any other system. Next, each of the data replication messages 320 may be retrieved from the message buffer 230 and stored in the respective queue of one of the sockets in the active socket pool 240. And finally, any of the data replication messages 320 that is placed in the respective queue of a socket may be transmitted (by the system 110) to the target system 120 by using that socket. The transmission may take place over the communications network 130, and it may be performed in a well-known fashion.

Each of the data replication messages 320 may include any suitable type of message that is used for backing up (or otherwise copying) data stored in the system 110. As such, each of the data replication messages may include either (i) a copy of data that is stored in the system 110, or (ii) replication data (e.g., snapshot data) that is generated based on the data that is storage system. It will be understood that the present disclosure is not limited to any specific type of data replication messages being transmitted from the system 110 to the system 120. It will further be understood, that the use of the phrase "data replication" is not intended to imply that any specific method for data copying, data generation, or data backup is being used by the system 110.

The data replication messages 320 may include synchronous data replication messages and asynchronous data replication messages. The synchronous data replication messages may be messages that are desired to be transmitted (over the communications network) with lower latency than the asynchronous data replication messages. The synchronous data replication messages may or may not differ from asynchronous data replication messages in their content.

As noted above, in some implementations, the system 110 may include a storage server or a storage system. In such implementations, the system 110 may be arranged to service incoming I/O requests by storing data associated with the I/O requests in a memory of the system 110 in addition to storing the data, the system 110 may execute a synchronous data replication process that is used to back up the data associated with the I/O requests as the I/O requests are being serviced. The synchronous data replication process may back up the data on the target system 120. The synchronous data replication process may back up the data by: (1) generating synchronous data replication messages based on the data associated with the I/O requests and (ii) transmitting the synchronous data replication messages to the target system 120. In some implementations, an I/O request may not be considered complete unless one or more synchronous data replication messages associated with the request have been successfully received by the target system 120. As can be readily appreciated, in such implementations, imposing low latency requirements on the synchronous data replication messages may be necessary in order for the storage system to meet operational constraints concerning the latency of the storage system as a whole.

Additionally or alternatively, in some implementations, the storage system 110 may be configured to execute an asynchronous data replication process. The asynchronous data replication process may be configured to back up data stored on the system 100 at predetermined time intervals. The asynchronous data replication process may back up the data that is stored on the system 110 by: (i) generating asynchronous data replication messages based on the data and (ii) transmitting the generated asynchronous data replication messages to the target system 120. Because asynchronous data replication is not performed in line (e.g., concurrently) with the servicing of I/O requests (and/or inline with the performance of other tasks), asynchronous data replication messages may be subject to more relaxed latency requirements than synchronous data replication messages.

Figure 4:
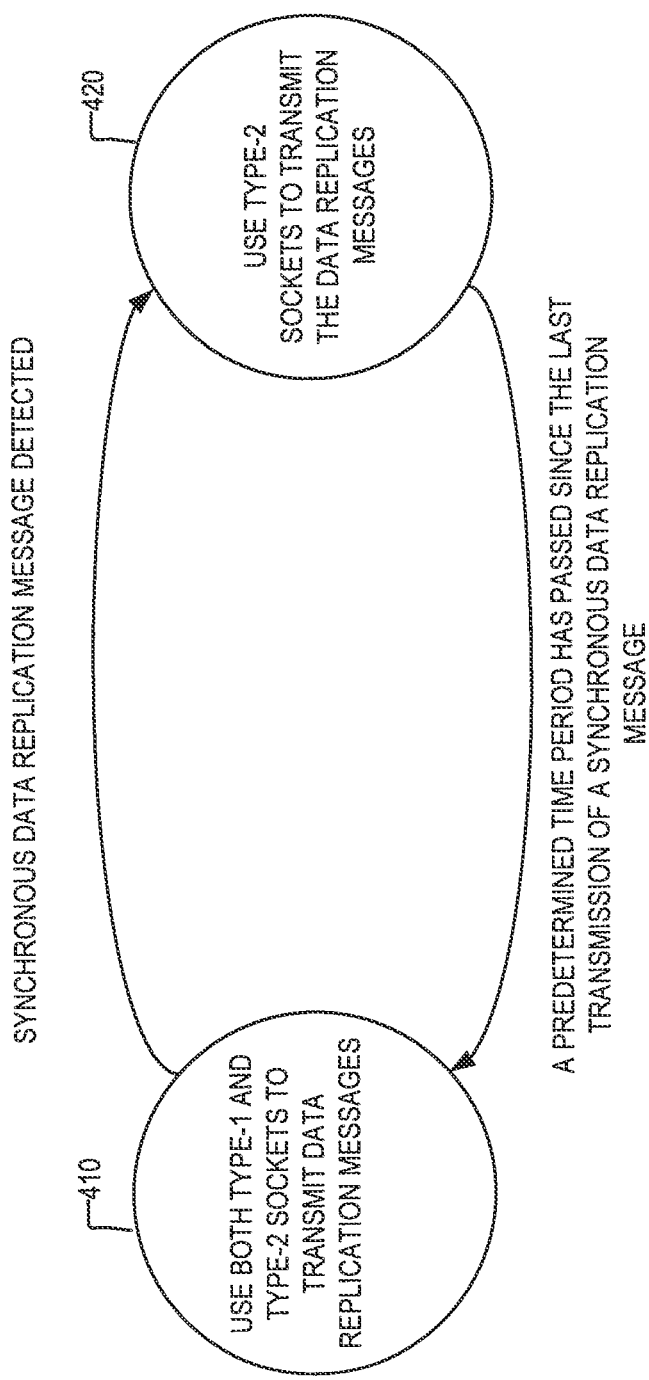
FIG. 4 is a state diagram illustrating the operation of the computing system of FIG. 2, according to aspects of the disclosure.

FIG. 4 is a state diagram illustrating the operation of the system 110, according to aspects of the disclosure. As illustrated, in some implementations, the system may be in one of a first state 410 and a second state 420. The state 410 may include a state in which the system 110 (and/or data replication manager 250) uses both the type-1 sockets 210 and the type-2 sockets 220 to transmit data replication messages to the system 120). The state 420 may include a state in which the system 110 (and/or the data replication manager 250) uses type-2 sockets to transmit data replication messages (e.g., to the system 120). While the system is in the state 420, the system 110 (and/or the data replication manager 250) may abstain from using type-1 sockets for the transmission of data replication messages.

As illustrated, the system 110 may transition from the state 410 and 420 when the data replication manager 250 detects a request for the transmission of a synchronous data replication message. On the other hand, the system 110 may transition from the state 410 to the state 420, when a predetermined amount of time (e.g., 1 second) has passed since the last transmission of a synchronous data replication message 110. Under this arrangement, when the system 110 is in the state 410, only asynchronous data replication messages may be transmitted by the system 110 (and/or the data replication manager 250), On the other hand, when the system 110 is in the state 420, both synchronous and asynchronous data replication messages may be transmitted by using the type-2 sockets 220 only.

In some implementations, the system 110 may be transitioned from state 410 to state 420 by the data replication manager 250. In such implementations, transitioning the system 110 from the state 410 to the state 420 may include removing, from the active socket pool 240, all type-1 sockets that are present in the active socket pool. Similarly, the system 110 may be transitioned from state 420 to state 410 by the data replication manager 250. Transitioning the system 110 from state 420 to state 410 may include adding one or more type-1 sockets to the active socket pool 240. Although in the example of FIG. 4, the system 110 is depicted as having only two possible data replication states, alternative implementations are possible in which the system 110 can assume additional states, such as a state in which no data replication messages are transmitted at all.

The present disclosure is not limited to any specific method for distinguishing between synchronous and asynchronous data replication messages. In some implementations, the system 110 (and/or the data replication manager 250) may detect whether a message is a synchronous data replication message based on a type identifier that is present in the messages' headers. The type identifier for any data replication message may include any suitable identifier that indicates whether the message is a synchronous data replication message or an asynchronous data replication message. Additionally or alternatively, in some implementations, the system 110 (and/or the data replication manager 250) may detect whether a message is a synchronous data replication message based on the identity of the process that has generated the message and/or requested transmission of the message. Additionally or alternatively, in some implementations, the system 110 (and/or the data replication manager 250) may detect that a data replication message is a synchronous data replication message based on the type of API call that is used to request transmission of the data replication message.

Figure 5:
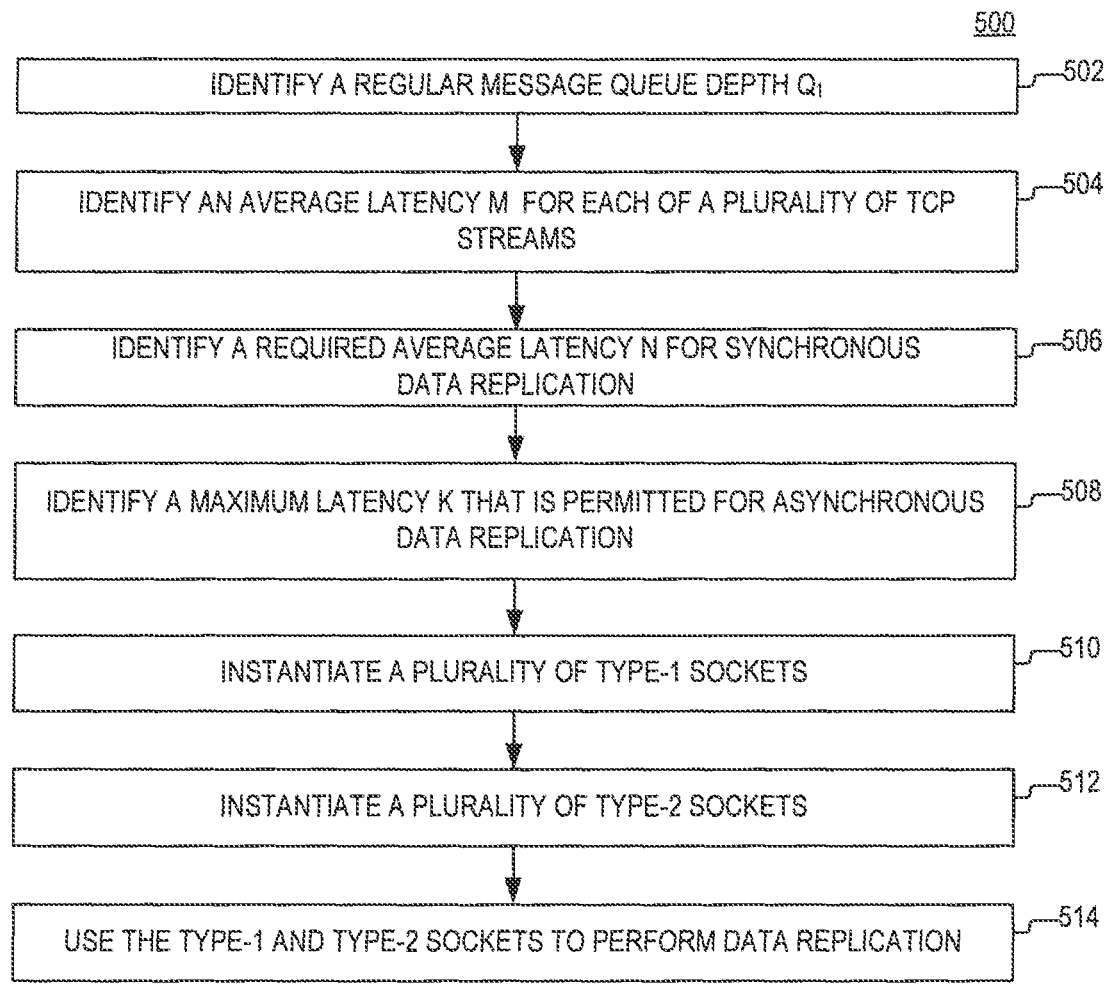
FIG. 5 is a flowchart of an example of a process, according to aspects of the disclosure.

In some respects, state 420 may be more suitable for the transmission of synchronous data replication messages. As noted above, synchronous data replication messages may require a lower network latency than asynchronous data replication messages. In some implementations, the latency of message transfer from the system 110 to the system 130 may be proportional to the number of sockets that are used on the system 110 for the transmission of the messages. Increasing the number of sockets may result in increased latency. When the system 110 is transitioned from the state 410 to the state 420, the number of sockets used to transmit data replication messages from the system 110 to the system 120 is effectively reduced, which in turn may help decrease the transmission latency of data replication messages that are transmitted from the system 110 to the system 120, FIG. 5 is a flowchart of an example of a process 500, according to aspects of the disclosure. According to the present example, the process 500 can be performed by the data replication manager 250. However, alternative implementations are possible in which the process 500 is performed by one or more other components of the system 110 instead of (or in addition to) the data replication manager 250.

At step 502, the data replication manager 250 identifies a first queue depth $Q_1$. In some implementations, the value $Q_1$ may be a positive number (e.g., an integer or a decimal number, etc.) greater than 1. In some implementations, identifying the first queue depth Q; may include retrieving the value Q; from a configuration file of the system 110. Additionally or alternatively, in some implementations, identifying the value $Q_1$ may include receiving a user input (e.g., via a keyboard or a touch screen) that specifies the value $Q_1$. In some implementations, the user input may be submitted by a system administrator who is tasked with configuring the data replication capabilities of the system 110.

At step 504, the data replication manager 250 identifies an average latency M which is associated with a flow control window of the system 110. In some implementations, the flow control window may include a TCP window. The average latency M may be based on the average latency of data replication messages that are transmitted by using the flow control window. In some implementations, the average latency of any of the data replication messages may be based on the duration of the period starting when the data replication message is transmitted and ending when an acknowledgment is received that the data replication message has been successfully delivered. However, it will be understood that the present disclosure is not limited to any specific convention for calculating data replication message latency.

In some implementations, the value M may be a number (e.g., an integer or a decimal number, etc.) greater than 0. In some implementations, identifying the value M may include retrieving the value M from a configuration file of the system 110. Additionally or alternatively, in some implementations, identifying the value M may include receiving a user input (e.g., via a keyboard or a touch screen) that specifies the value M. In some implementations, the user input may be submitted by a system administrator who is tasked with configuring the data replication capabilities of the system 110. Additionally or alternatively, in some implementations, identifying the value M may include recording the latency of data replication messages that are transmitted by using one or more flow control windows of the system 110 and calculating their average.

At step 506, the data replication manager 250 identifies a required average latency N for synchronous data replication. The value N may specify the average latency, of message transmission, that is needed in order for synchronous data replication to be carried out successfully by the system 110. Additionally or alternatively, the value N may specify the average latency at which synchronous data replication messages need to be delivered from the system 110 to the system 120. In some implementations, the value N may be a number (e.g., an integer or a decimal number, etc.) greater than 0. In some implementations, identifying the value N may include retrieving the value N from a configuration file of the system 110. Additionally or alternatively, in some implementations, identifying the value N may include receiving a user input (e.g., via a keyboard or a touch screen) that specifies the value N. In some implementations, the user input may be submitted by a system administrator who is tasked with configuring the data replication capabilities of the system 110.

At step 508, the data replication manager 250 identifies a maximum latency K for asynchronous data replication. The value K may specify the maximum latency, of message transmission, which can be tolerated if asynchronous data replication were to be carried out successfully by the system 110. Additionally or alternatively, the value K may specify the maximum latency at which asynchronous data replication messages can be delivered from the system 110 to the system 120. In some implementations, the value K may be a number (e.g., an integer or a decimal number, etc.) greater than N (e.g., at least twice as large as K, at least three times as large as K, etc.). In some implementations, identifying the value K may include retrieving the value K from a configuration file of the system 110. Additionally or alternatively, in some implementations, identifying the value K may include receiving a user input (e.g., via a keyboard or a touch screen) that specifies the value K. In some implementations, the user input may be submitted by a system administrator who is tasked with configuring the data replication capabilities of the system 110.

At step 510, data replication manager 250 instantiates the plurality of type-1 sockets 210. In some implementations, each of the type-1 sockets may have a first queue depth that is equal to the value $Q_1$, which is identified at step 502. In some implementations, the number of type 1 sockets that are instantiated at step 510 may be determined by using Equation 1 below:

$$C_1 = \frac{K-N}{M*Q_1}, \qquad \text{(Eq. 1)}$$

where $C_1$ is the count of type-1 sockets that are instantiated, K is the maximum latency determined at step 508, N is the average latency value determined at step 506, M is the average latency value that is determined at step 504, and $Q_1$ is the first queue depth that is determined at step 502.

At step 512, the data replication manager 250 instantiates the plurality of type-2 sockets 220. In some implementations, the number of type-2 sockets that are instantiated at step 512 may be determined by using Equation 2 below:

$$C_2 = \frac{N}{M*Q}, \qquad \text{(Eq. 2)}$$

where $C_2$ is the count of type-2 sockets that are instantiated, N is the average latency value determined at step 506, M is the average latency value that is determined at step 504, and $Q_1$ is the first queue depth that is determined at step 502.

In some implementations, each of the type-2 sockets may have a second queue depth that is determined based on the first queue depth. In some implementations, the second queue depth may be determined by using Equation 3 below:

$$Q_2 = \frac{Q_1}{K-N}, \quad \text{(Eq. 3)}$$

where $Q_2$ is the second queue depth, $Q_1$ is the first queue depth that is determined at step 502, K is the maximum latency determined at step 508, and N is the average latency value determined at step 506.

At step 514, the data replication manager 250 begins performing data replication by using the type-1 sockets 210 and the type-2 sockets 220. The manner in which step 514 is performed is described further below with respect to FIGS. 6 and 7.

Figure 6:
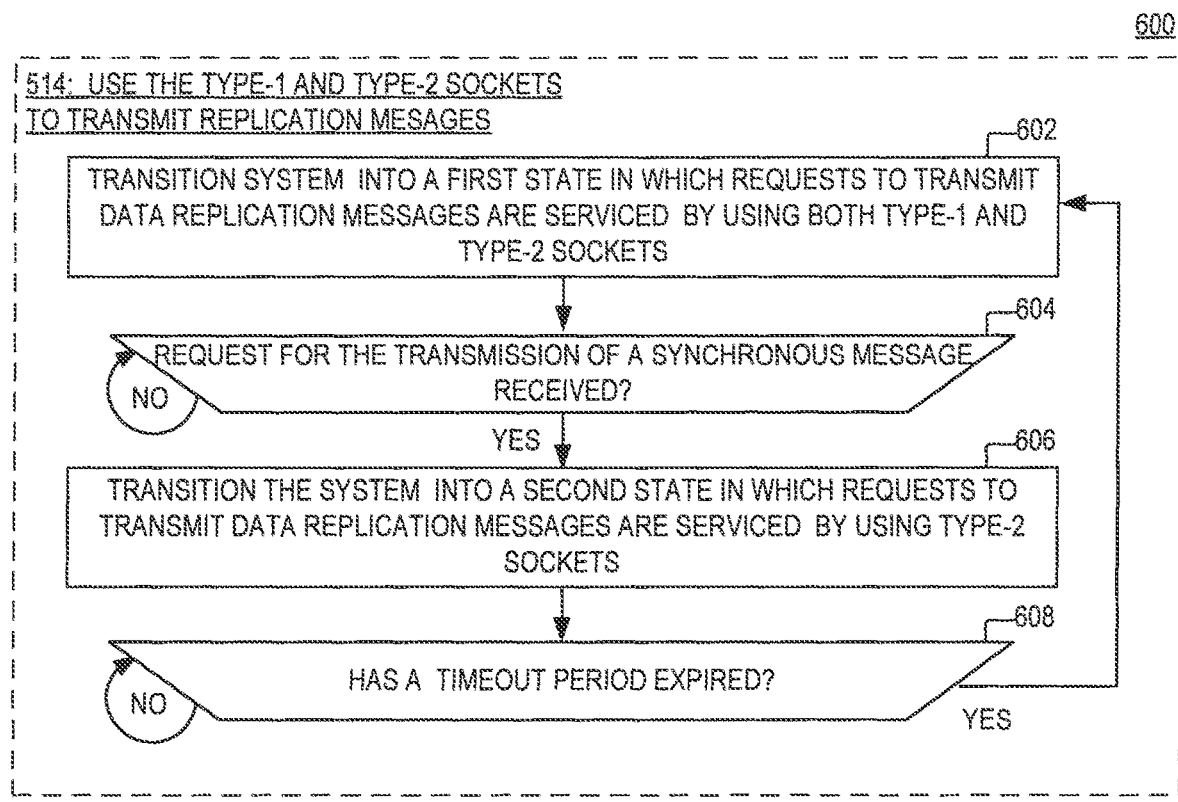
FIG. 6 is a flowchart of an example of a process, according to aspects of the disclosure.

FIG. 6 is a flowchart of a process 600, for transmitting data replication messages by using type-1 and type-2 sockets, as specified by step 514 of the process 500. At step 602, the data replication manager 250 transitions the system 110 into the state 410. At step 604, the data replication manager 250 detects whether a request is received (by the data replication manager 250 or another component of the system 110) for the transmission of a synchronous data replication message. If no such request is received, the system 110 remains in the state 410 and step 604 is repeated again. Otherwise, if such a request is received, the process 600 proceeds to step 606. At step 606, the data replication manager transitions the system 110 into the state 420. At step 608, the data replication manager 250 detects whether a timeout period has expired. The timeout period may be a period starting when a synchronous data replication message is transmitted for the last time by the system 110. The timeout period may be reset every time the system 110 transmits a new synchronous data replication message. If the time out period has expired, the process 600 returns to step 602, and the system 110 is transitioned back to the state 410. Otherwise, if the timeout period has not expired, the system 110 remains in the state 420, and step 608 is repeated again.

Figure 7:
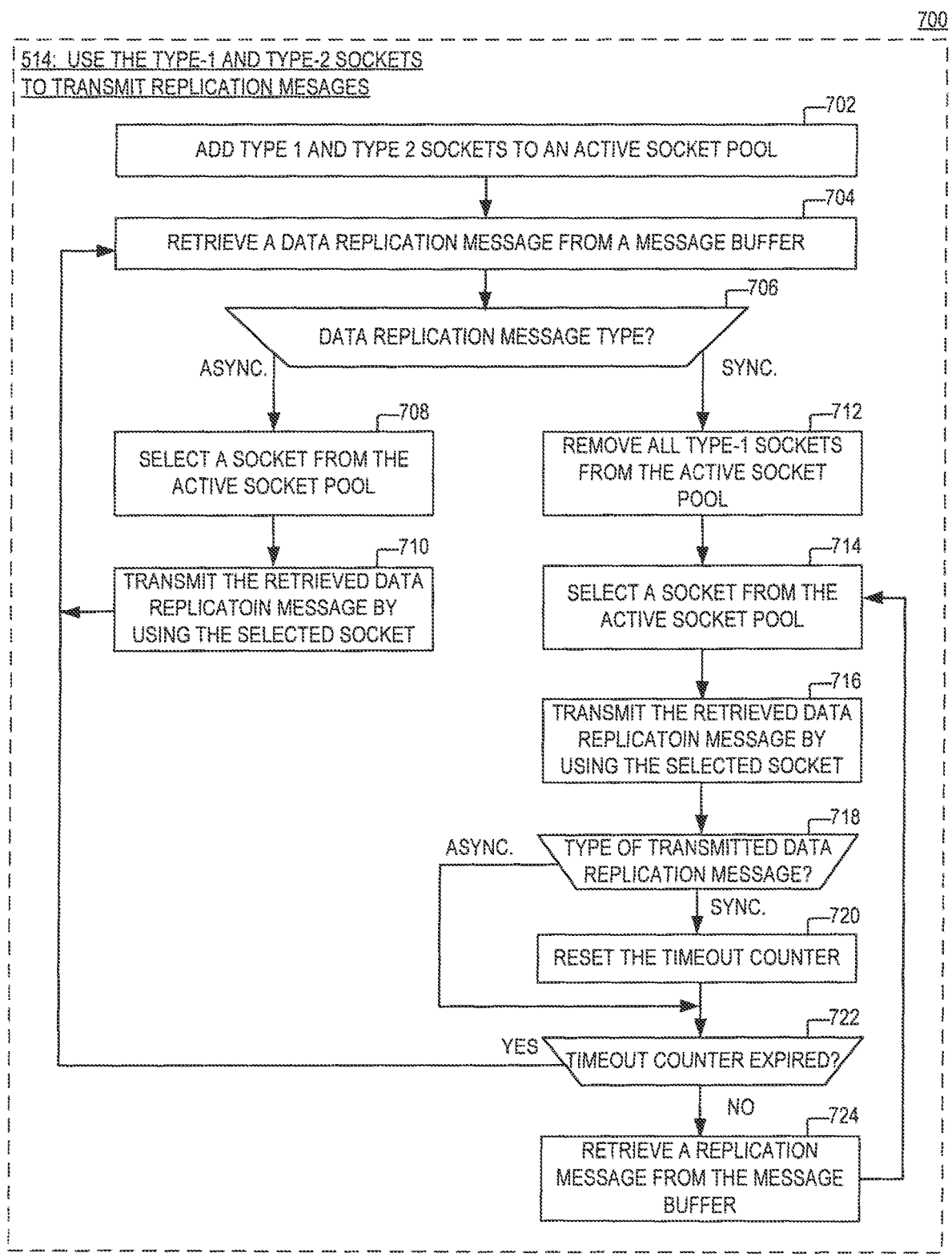
FIG. 7 is a flowchart of an example of a process, according to aspects of the disclosure.

FIG. 7 is a flowchart of a process 700, for transmitting data replication messages by using type-1 and type-2 sockets, as specified by step 514 of the process 500. At step 702, the data replication manager adds the plurality of type-1 sockets 210 and the plurality of type-2 sockets 220 to the active socket pool 240. At step 704, the data replication manager 250 retrieves a data replication message from the message buffer 230. At step 706, the data replication manager 250 determines whether the retrieved message is a synchronous data replication message or an asynchronous data replication message. If the retrieved message is a synchronous data replication message, the process 700 proceeds to step 708. Otherwise, if the retrieved message is an asynchronous data replication message, the process 700 proceeds to step 712.

At step 708, the data replication manager 250 selects a socket from the active socket pool 240. The selected socket may be either a type-1 socket or a type-2 socket. At step 710, the data replication manager 250 transmits the retrieved message by using the selected socket. In some implementations, transmitting the selected message may include removing the selected message from the message buffer 230 and adding the selected message to the respective queue of the selected socket.

At step 712, the data replication manager 250 removes, from the active socket pool 240, all type-1 sockets that are present in the active socket pool 240. After step 712 is complete, no type-1 sockets may remain in the active socket pool 240. At step 714, the data replication manager 250 selects a socket from the active socket pool 240. As can be readily appreciated, the selected socket is guaranteed to be a type-2 socket. At step 716, the data replication manager 250 transmits the retrieved message by using the selected socket. In some implementations, transmitting the selected message may include removing the selected message from the message buffer 230 and adding the selected data replication message to the respective queue of the selected socket. At step 718, the data replication manager 250 determines the type of the data replication message transmitted at step 716. If the data replication message transmitted at step 716 is a synchronous data replication message, the process 700 proceeds to step 720. On the other hand, if the transmitted message is an asynchronous data replication message, the process 700 proceeds to step 720. At step 720, a timeout counter is reset. The timeout counter may be configured to measure the duration of the period starting when a synchronous data replication message is transmitted for the last time, and it may be reset every time a new synchronous data replication message is transmitted. At step 722, a determination is made if a timeout counter has expired. If the timeout has expired, the process 700 proceeds to step 704. Otherwise, if the timeout counter has not expired, the process 700 proceeds to step 724. At step 724, the data replication manager 250 retrieves another data replication message from the message buffer 230. After the data replication message is retrieved, the process 700 returns to step 714.

Figure 8:
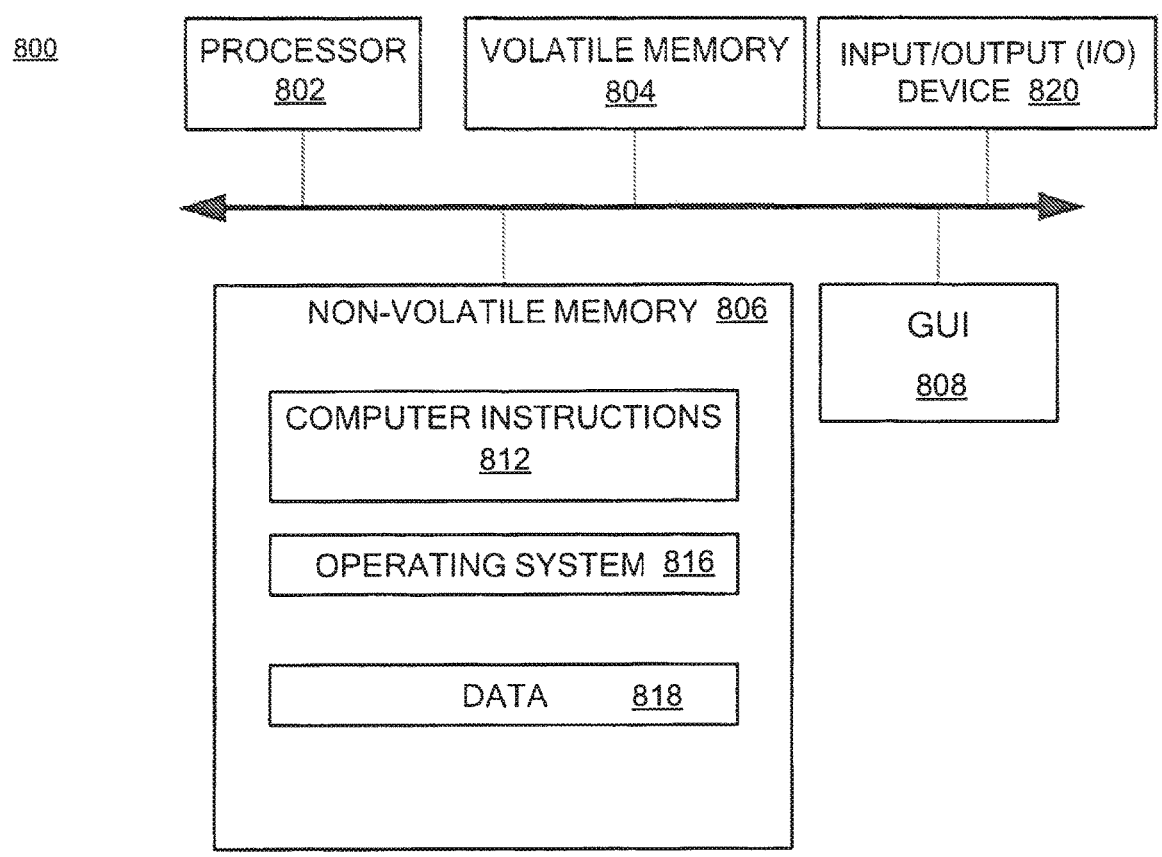
FIG. 8 is a diagram of an example of a computing device, according to aspects of the disclosure.

Referring to FIG. 8, in some implementations, the system 110 (or portion thereof) may be implemented as a computing device 800. The computing device 800 may include processor 802, volatile memory 804 (e.g., RAM), non-volatile memory 806 (e.g., a hard disk drive, a solid state drive such as a flash drive, a hybrid magnetic and solid state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the process 500 and/or any other function of the storage system 100.

FIGS. 1-8 are provided as an example only. At least some of the steps discussed with respect to FIGS. 1-8 may be performed in parallel, in a different order, or altogether omitted. As used in this application, the word "exemplary" is used herein to mean serving as an example, may instance, or illustration. As used throughout the disclosure, the term "data replication message" may include any message that contains data that is desired to be transferred from one computing system to another. It will be understood that, in the present disclosure, the definition of a "data replication message" is in no way limited to messages that are transmitted when a particular data replication/backup function of a storage system is performed. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
instantiating a first plurality of type-1 network sockets on a source computing system, each of the type-1 network sockets having a first queue depth;
instantiating a second plurality of type-2 network sockets on the source computing system, each of the type-2 network sockets having a second queue depth that is greater than the first queue depth;
transitioning the source computing system into a first state, the first state being one in which data replication messages are transmitted by the source computing system to a target computing system by using both the type-1 and type-2 network sockets; and
transitioning the source computing system from the first state into a second state, the second state being one in which data replication messages are transmitted, by the source computing system to the target computing system, by using the type-2 network sockets,
wherein the source computing system is transitioned from the first state to the second state in response to detecting a request to transmit a synchronous data replication message, wherein transitioning the source computing system from the first state into the second state includes modifying an active socket pool that is used for the transmission of data replication messages, such that, when the source computing system is in the second state, no type-1 network sockets are used, by the source computing system, for the transmission of data replication messages, and wherein the type-1 network sockets are dynamically added and removed from the active socket pool depending on a type of data replication that is performed by the source computing system.

2. The method of claim 1, further comprising transitioning the source computing system from the second state back to the first state in response to detecting that a predetermined time period has passed since a last transmission of a synchronous data replication message.

3. The method of claim 1, wherein:

the data replication messages that are transmitted by the source computing system while the source computing system is in the first state include only asynchronous data replication messages, and the data replication messages that are transmitted by the source computing system while the source computing system is in the second state include both synchronous and asynchronous data replication messages.

4. The method of claim 1, wherein modifying the active socket pool includes removing the first plurality of type-1 network sockets from the active socket pool.

5. The method of claim 1, further comprising identifying an average latency requirement for synchronous data replication, wherein the second queue depth is selected based on the average latency requirement for synchronous data replication.

6. The method of claim 1, wherein instantiating the second plurality of type-2 network sockets includes selecting the second queue depth based on the first queue depth.

7. The method of claim 1, further comprising identifying an average latency of a flow control window, wherein the first plurality of type-1 network sockets is instantiated based on the average latency of the flow control window.

8. A system comprising:

a memory; and at least one processor operatively coupled to the memory, the at least one processor being configured to perform the operations of:

instantiating a first plurality of type-1 network sockets, each of the type-1 network sockets having a first queue depth;

instantiating a second plurality of type-2 network sockets, each of the type-2 network sockets having a second queue depth that is greater than the first queue depth;

transitioning the system into a first state, the first state being one in which data replication messages are transmitted by the at least one processor to another system by using both the type-1 and type-2 network sockets; and transitioning the system from the first state into a second state, the second state being one in which data replication messages are transmitted by the at least one processor to the other system by using only the type-2 network sockets, wherein the transition from the first state to the second state is performed in response to detecting a request to transmit a synchronous data replication message, wherein transitioning the system from the first state into the second state includes modifying an active socket pool that is used for the transmission of data replication messages, such that, when the system is in the second state, no type-1 network sockets are used, by the system, for the transmission of data replication messages, and wherein the type-1 network sockets are dynamically added and removed from the active socket pool depending on a type of data replication that is performed by the system.

9. The system of claim 8, the at least one processor is further configured to perform the operation of transitioning the system from the second state back to the first state in response to detecting that a predetermined time period has passed since a last transmission of a synchronous data replication message.

10. The system of claim 8, wherein:

the data replication messages that are transmitted while the system is in the first state include only asynchronous data replication messages, and the data replication messages that are transmitted while the system is in the second state include both synchronous and asynchronous data replication messages.

11. The system of claim 8, wherein modifying the active socket pool includes removing the first plurality of type-1 network sockets from the active socket pool.

12. The system of claim 8, wherein the at least one processor is further configured to perform the operation of identifying an average latency requirement for synchronous data replication, and the second queue depth is selected based on the average latency requirement for synchronous data replication.

13. The system of claim 8, wherein instantiating the second plurality of type-2 network sockets includes selecting the second queue depth based on the first queue depth.

14. The system of claim 8, wherein the at least one processor is further configured to perform the operation of identifying an average latency of a flow control window, wherein the first plurality of type-1 network sockets is instantiated based on the average latency of the flow control window.

15. A non-transitory computer-readable medium storing one or more processor-executable instructions, which when executed by at least one processor of a system cause the at least one processor to perform the operations of:

instantiating a first plurality of type-1 network sockets, each of the type-1 network sockets having a first queue depth;

instantiating a second plurality of type-2 network sockets, each of the type-2 network sockets having a second queue depth that is greater than the first queue depth;

transitioning the system into a first state, the first state being one in which data replication messages are transmitted by the at least one processor to another system by using both the type-1 and type-2 network sockets; and transitioning the system from the first state into a second state, the second state being one in which data replication messages are transmitted by the at least one processor to the other system by using only the type-2 network sockets, wherein the transition from the first state to the second state is performed in response to detecting a request to transmit a synchronous data replication message, wherein transitioning the system from the first state into the second state includes modifying an active socket pool that is used for the transmission of data replication messages, such that, when the system is in the second state, no type-1 network sockets are used, by the system, for the transmission of data replication messages, and wherein the type-1 network sockets are dynamically added and removed from the active socket pool depending on a type of data replication that is performed by the system.

16. The non-transitory computer-readable medium of claim 15, wherein the processor-executable instructions, when executed by the at least one processor, further cause the at least one processor to perform the operation of transitioning the system from the second state back to the first state in response to detecting that a predetermined time period has passed since a last transmission of a synchronous data replication message.

17. The non-transitory computer-readable medium of claim 15, wherein:

the data replication messages that are transmitted while the system is in the first state include only asynchronous data replication messages, and the data replication messages that are transmitted while the system is in the second state include both synchronous and asynchronous data replication messages.

18. The non-transitory computer-readable medium of claim 15, wherein modifying the active socket pool includes removing the first plurality of type-1 network sockets from the active socket pool.

19. The non-transitory computer-readable medium of claim 15, wherein the processor-executable instructions, when executed by the at least one processor, further cause the at least one processor to of identifying an average latency requirement for synchronous data replication, and the second queue depth is selected based on the average latency requirement for synchronous data replication.

20. The non-transitory computer-readable medium of claim 15, wherein instantiating the second plurality of type-2 network sockets includes selecting the second queue depth based on the first queue depth.

* * * * *